US010890871B2

United States Patent
Saito (10) Patent No.: US 10,890,871 B2
(45) Date of Patent: Jan. 12, 2021

(54) SHEET HOUSING DEVICE WITH PIVOT ROTATION MECHANISM FOR USER ACCESS

(71) Applicant: TOSHIBA TEC KABUSHIKI KAISHA, Tokyo (JP)

(72) Inventor: Yuichi Saito, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/217,511

(22) Filed: Dec. 12, 2018

(65) Prior Publication Data
US 2020/0192267 A1    Jun. 18, 2020

(51) Int. Cl.
| | | |
|---|---|---|
| *B65H 1/26* | (2006.01) | |
| *G05G 15/00* | (2006.01) | |
| *G03G 15/00* | (2006.01) | |
| *H04N 1/00* | (2006.01) | |
| *A47B 88/467* | (2017.01) | |
| *A47B 88/48* | (2017.01) | |
| *B65H 1/04* | (2006.01) | |
| *A47B 88/60* | (2017.01) | |

(52) U.S. Cl.
CPC ....... *G03G 15/6502* (2013.01); *A47B 88/467* (2017.01); *A47B 88/48* (2017.01); *A47B 88/60* (2017.01); *B65H 1/04* (2013.01); *B65H 1/266* (2013.01); *H04N 1/00254* (2013.01); *G03G 2215/00388* (2013.01)

(58) Field of Classification Search
CPC ...... B65H 1/266; B65H 1/04; B65H 2402/30; B65H 2402/32; B65H 2405/31; B65H 2405/32; A47B 88/48; A47B 88/60; A47B 88/467; G03G 15/6502; G03G 2215/00388
See application file for complete search history.

(56) References Cited

U.S. PATENT DOCUMENTS

| | | | | |
|---|---|---|---|---|
| 1,816,213 | A * | 7/1931 | Duke | A47B 88/48 312/294 |
| 4,983,000 | A * | 1/1991 | Rock | A47B 88/467 312/333 |
| 8,714,544 | B2 * | 5/2014 | Totsuka | G03G 15/6511 271/162 |
| 9,016,811 | B2 * | 4/2015 | Raunikar | A47B 88/40 312/249.7 |
| 9,039,009 | B2 * | 5/2015 | Oshiro | B65H 1/266 271/259 |
| 9,637,331 | B2 | 5/2017 | Iwama | |

FOREIGN PATENT DOCUMENTS

JP           04101931 A  *  4/1992

* cited by examiner

*Primary Examiner* — Luis A Gonzalez
(74) *Attorney, Agent, or Firm* — Kim & Stewart LLP (57) ABSTRACT

A sheet housing device includes a sheet cassette, a frame, and a support member. The frame is configured to support the sheet cassette such that the sheet cassette is movable relative to the frame between a closed position and a drawn-out position along a first direction different from a gravity direction. The support member is configured to support the frame such that the frame is rotatable around a pivot axis extending in a second direction orthogonal to the first direction and the gravity direction.

15 Claims, 9 Drawing Sheets

SHEET HOUSING DEVICE WITH PIVOT ROTATION MECHANISM FOR USER ACCESS

FIELD

Embodiments described herein relate generally to a sheet housing device.

BACKGROUND

An image processing apparatus, such as an image forming apparatus and an image decoloring apparatus, comprises a sheet housing device including a cassette for sheet storage. The cassette can be drawn out from the image processing apparatus when a user adds sheets to the cassette or takes out sheets from the cassette. It is desirable if the user can more conveniently add and take out sheets from the cassette.

DETAILED DESCRIPTION

According to an embodiment, a sheet housing device includes a sheet cassette, a frame, and a support member. The frame is configured to support the sheet cassette such that the sheet cassette is movable relative to the frame between a closed position and a drawn-out position along a first direction different from a gravity direction. The support member is configured to support the frame such that the frame is rotatable around a pivot axis extending in a second direction orthogonal to the first direction and the gravity direction.

Hereinafter, a sheet housing device and an image processing apparatus, such as an image forming apparatus and an image decoloring apparatus, according to several embodiments are described with reference to the accompanying drawings.

As a coordinate system of a whole image processing apparatus (e.g., an image forming apparatus or a decoloring apparatus), X direction, Y direction and Z direction are defined as follows. X direction is the front-rear direction of the image processing apparatus. +X direction is a direction toward the front side of the image processing apparatus (with respect to a paper surface in FIG. 1 and FIG. 9). Y direction is a left-right direction of the image processing apparatus. +Y direction is a direction towards a right side of the image processing apparatus. Z direction is a vertical direction, and +Z direction is an upward direction.

First Embodiment

Figure 1:
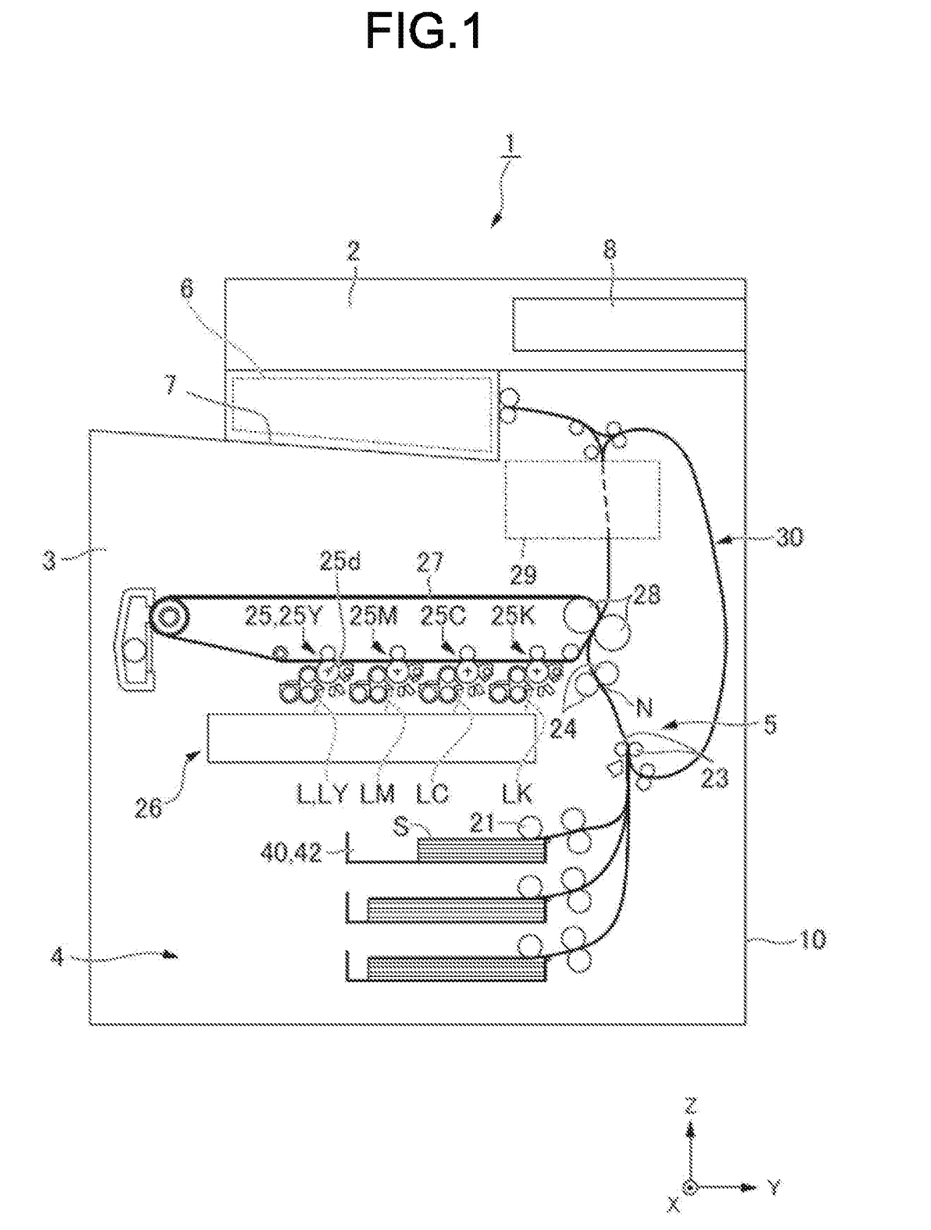
FIG. 1 is a diagram schematically illustrating a configuration of an image processing apparatus according to a first embodiment.

FIG. 1 is a diagram schematically illustrating a configuration of an image processing apparatus according to an first embodiment.

The image processing apparatus of the first embodiment is an image forming apparatus. The image forming apparatus performs a processing of forming an image on a sheet.

The image forming apparatus 1 includes a housing 10, a scanner section 2, an image forming unit 3, a sheet feed section 4, a conveyance section 5, an inversion unit 30, a sheet discharge tray 7, a control panel 8, and a controller 6.

The housing 10 forms an outer shape of the image forming apparatus 1. The housing 10 may regionally separate the components of the image forming apparatus 1 in the image forming apparatus 1.

The scanner section 2 scans an image of a copying object based on intensity of light to generate an image signal. The scanner section 2 outputs the generated image signal to the image forming unit 3.

The image forming unit 3 forms an output image with a developer containing toner or the like (hereinafter referred to as a toner image) based on the image signal received from the scanner section 2 or an image signal received from an external device. The image forming unit 3 transfers the toner image onto a surface of a sheet S. The image forming unit 3 applies heat and pressure to the toner image on the surface of the sheet S to fix the toner image on the sheet S. In other words, the image forming unit 3 performs an image forming processing on the sheet S. The image forming unit 3 is described in more detail below.

The sheet feed section 4 feeds sheets S one by one to the conveyance section 5 in synchronization with a timing when the image forming unit 3 forms a toner image. The sheet feed section 4 has a sheet housing device 40 and a pickup roller 21.

The sheet housing device 40 has a cassette 42. The cassette 42 accommodates the sheets S of a predetermined size and type. The movement of the cassette 42 in a draw-out direction is restricted by a lock mechanism (not shown). The sheet housing device 40 is described in more detail below.

The pickup roller 21 picks up the sheets S one by one from the cassette 42. The pickup roller 21 feeds each of the sheets S taken out to the conveyance section 5.

The conveyance section 5 conveys the sheet S supplied from the sheet feed section 4 to the image forming unit 3. The conveyance section 5 includes a conveyance roller 23 and a registration roller 24.

The conveyance roller 23 conveys the sheet S supplied from the pickup roller 21 to the registration roller 24. The conveyance roller 23 abuts against the tip of the sheet S in a conveyance direction at a nip N of the registration roller 24.

The registration roller 24 warps the sheet S at the nip N to align the tip of the sheet S in the conveyance direction. The registration roller 24 conveys the sheet S in synchronization with a timing at which the image forming unit 3 transfers the toner image onto the sheet S.

The configuration of the image forming unit 3 is described below.

The image forming unit 3 includes a plurality of image forming sections 25, a laser scanning unit 26, an intermediate transfer belt 27, a transfer section 28, a fixing device 29, and the inversion unit 30.

The image forming section 25 includes a photoconductive drum 25d. The image forming section 25 forms a toner image on the photoconductive drum 25d in response to the image signal from the scanner section 2 or from the external device. The plurality of image forming sections 25Y, 25M, 25C, and 25K form toner images with yellow toner, magenta toner, cyan toner, and black toner, respectively.

Around the photoconductive drum 25d, a charger, a developing device, and the like are arranged. The charger charges the surface of the photoconductive drum 25d. The developing device accommodates developers including corresponding one of the yellow toner, the magenta toner, the cyan toner, and the black toner. The developing device develops the electrostatic latent image on the photoconductive drum 25d. As a result, a toner image formed with the toner of a corresponding color is formed on the photoconductive drum 25d.

The laser scanning unit 26 scans the charged photoconductive drums 25d with laser light L to expose the photoconductive drums 25d. The laser scanning unit 26 exposes the photoconductive drums 25d of the image forming sections 25Y, 25M, 25C, and 25K of the respective colors with different laser beams LY, LM, LC, and LK. As a result, the laser scanning unit 26 forms electrostatic latent images on the photoconductive drums 25d, respectively.

The toner image on the surface of the photoconductive drum 25d is primarily transferred onto the intermediate transfer belt 27.

The transfer section 28 transfers the toner image primarily transferred onto the intermediate transfer belt 27 to the surface of the sheet S at a secondary transfer position.

The fixing device 29 applies heat and pressure to the sheet S to fix the toner image transferred onto the sheet S.

The inversion unit 30 reverses the sheet S to form an image on a back surface of the sheet S. The inversion unit 30 reverses front and back surfaces of the sheet S discharged from the fixing device 29 by switchback. The inversion unit 30 conveys the reversed sheet S towards the registration roller 24.

The sheet discharge tray 7 is a tray on which the discharged sheet S on which an image is formed is placed.

The control panel 8 is a part of an input section for an operator to input information for operating the image forming apparatus 1. The control panel 8 has a touch panel and various hard keys.

The controller 6 controls each section of the image forming apparatus 1.

The sheet housing device 40 is described below.

Figure 2:
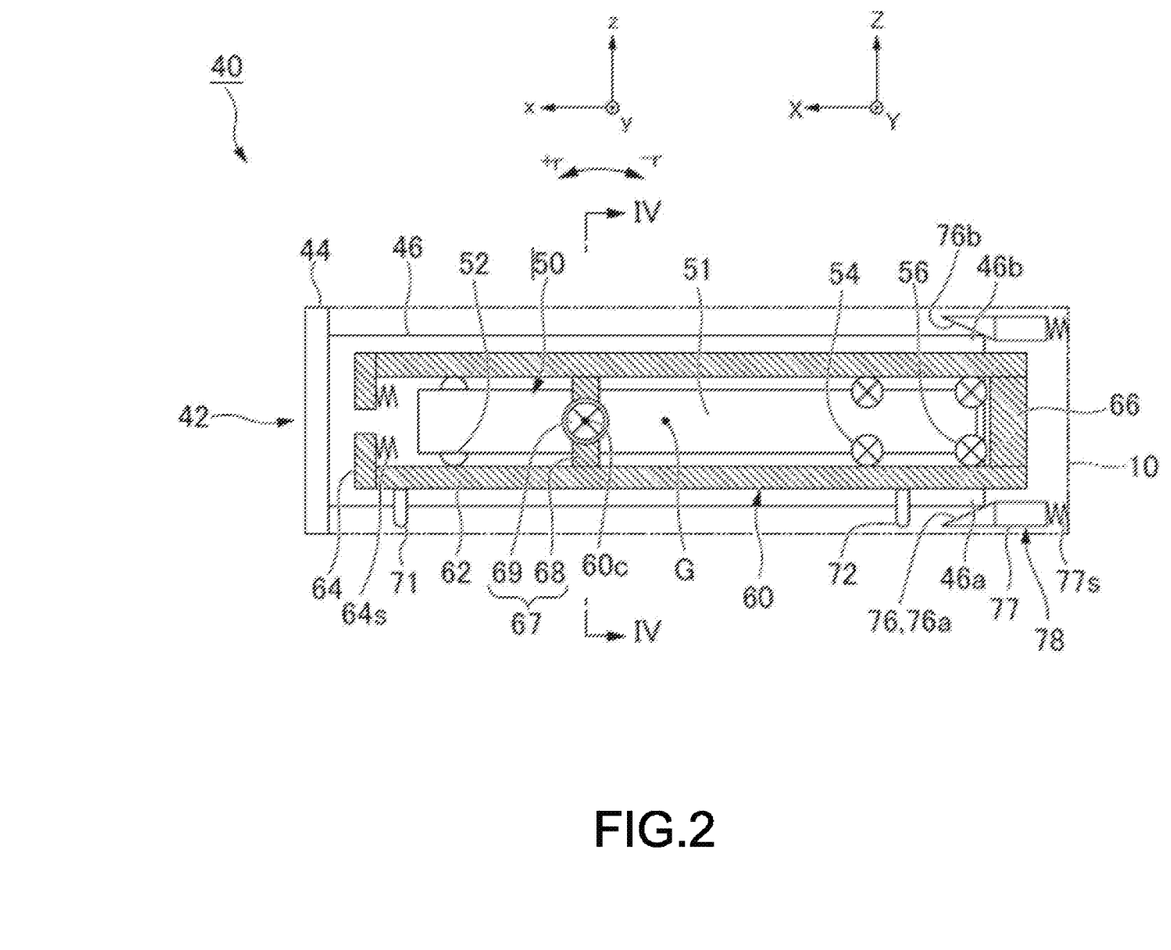
FIG. 2 is a side view of a sheet housing device.

FIG. 2 is a side view of the sheet housing device.

As a local coordinate system of the sheet housing device 40, x direction, y direction, z direction and r direction are defined as follows. x direction is a direction along which the cassette 42 moves with respect to a frame 60. +x direction (draw-out direction) is a direction in which the state of the cassette 42 changes from an accommodated state to a drawn-out state. The accommodated state and the drawn-out state are described below. −x direction (accommodation direction) is opposite to +x direction. z direction is the vertical direction (gravity direction), and +z direction is an upward direction. y direction is a direction orthogonal to x direction and z direction. r direction is a circumferential direction of y axis. +r direction is a direction in which +x side of y axis rotates towards −z direction. −r direction is a direction in which −x side of y axis rotates to −z direction.

As shown in FIG. 2, the sheet housing device 40 has the cassette 42, the frame 60, and a horizontal holding mechanism (holding mechanism) 78.

Figure 6:
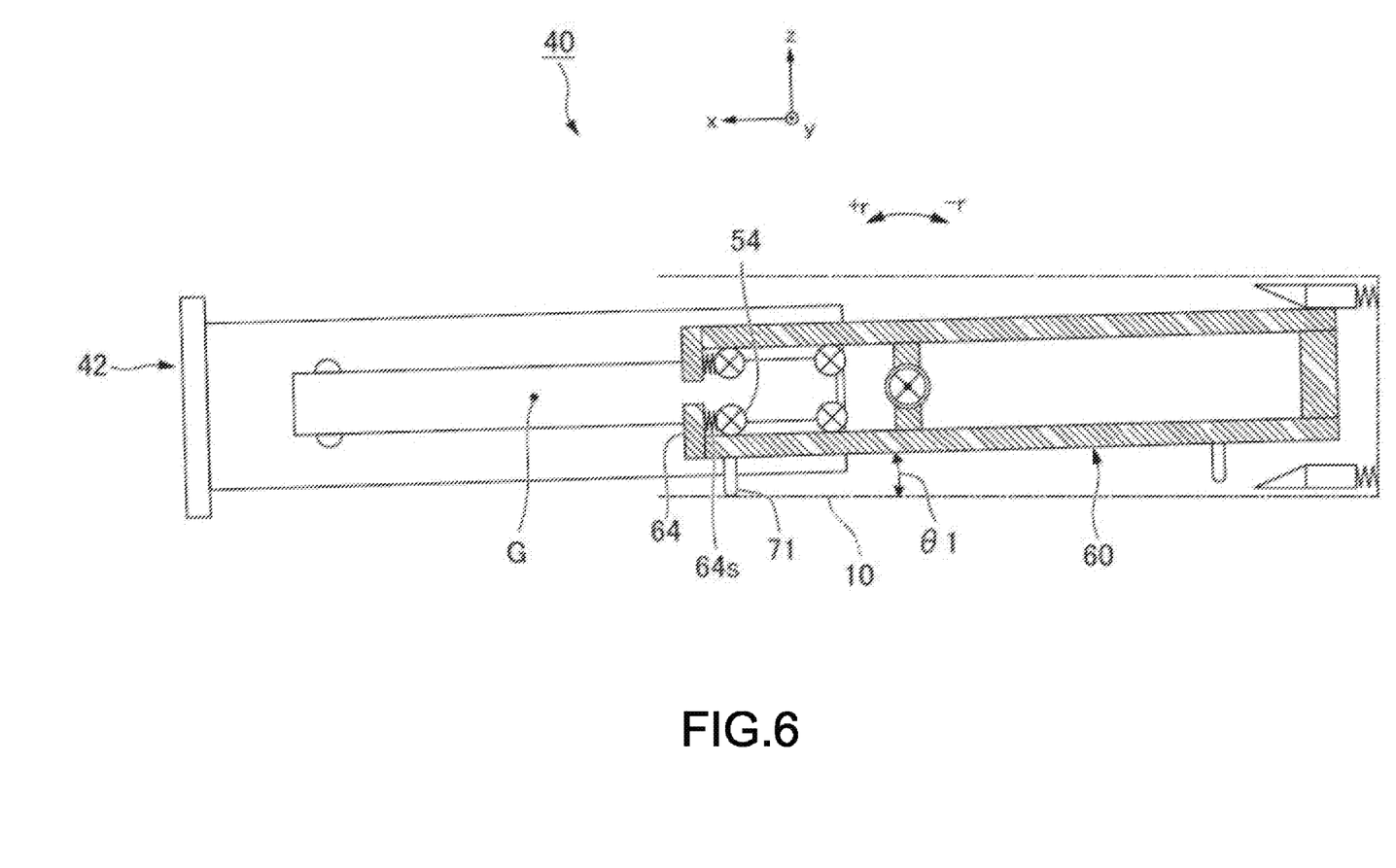
FIG. 6 is a diagram illustrating a second operation of the sheet housing device.

The frame 60 is arranged in the image forming apparatus 1. The cassette 42 can be drawn out from the frame 60 in x direction. As shown in FIG. 2, the cassette 42 moves to a limit of movement in −x direction to enter a state of being accommodated in the frame 60. The state in which the cassette 42 is accommodated in the frame 60 is referred to as the accommodated state, and the position of the cassette 42 in the accommodated state is referred to as a closed position. As shown in FIG. 6, the cassette 42 moves to a limit of movement in +x direction to enter a state of being drawn out from the frame 60. The state in which the cassette 42 is drawn out from the frame 60 is referred to as the drawn-out state, and the position of the cassette 42 in the drawn-out state is referred to as a drawn-out position.

The cassette 42 has a cover 44, a cassette main body 46, and a moving mechanism 50.

The cover 44 is arranged at an end in +x direction of the cassette 42. The cover 44 constitutes a part of the surface in +X direction of the image forming apparatus 1. The cover 44 has a gripping portion (not shown) that an operator grips at the time of drawing the cassette 42 out.

The cassette main body 46 is arranged in −x direction of the cover 44. The cassette main body 46 is formed into a box shape opening towards +z direction.

Figure 3:
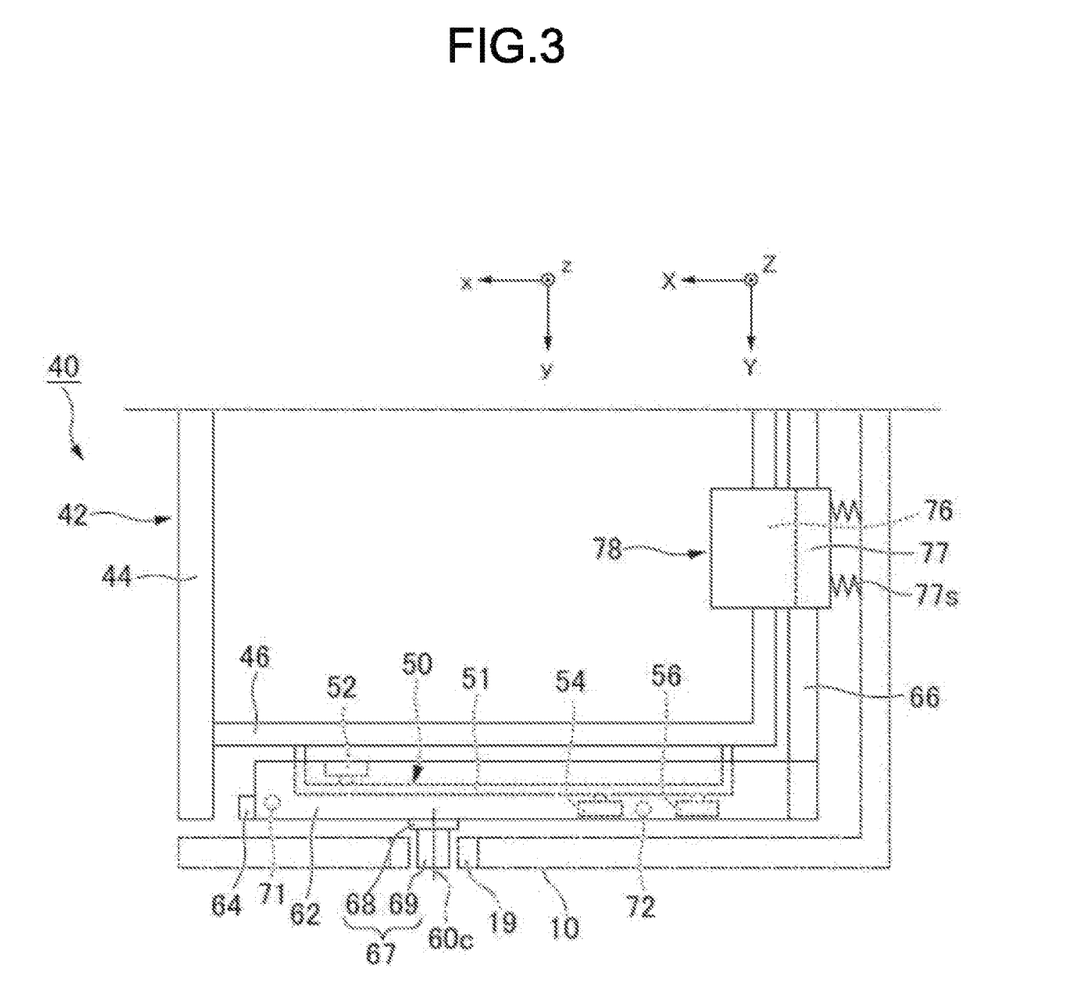
FIG. 3 is a plan view of the sheet housing device.

FIG. 3 is a plan view of the sheet housing device. In FIG. 3, half of the sheet housing device 40 in −y direction is shown. The sheet housing device 40 has a plane symmetrical shape with an xz plane as a plane of symmetry, unless otherwise mentioned.

The moving mechanism 50 is formed on a side surface of the cassette main body 46 in y direction. The moving mechanism 50 has a base member 51, a first wheel 52, a second wheel 54, and a third wheel 56.

The base member 51 is formed in an elongated plate shape extending in x direction. A normal line of the base member 51 is parallel to y direction. Both ends of the base member 51 in x direction are connected to the cassette main body 46 while bending towards the cassette main body 46.

The first wheel 52 is arranged between the base member 51 and the cassette main body 46 in y direction as shown in FIG. 3. The first wheel 52 is supported by the base member 51 in a state in which the first wheel 52 is rotatable around a rotation axis parallel to y direction. The first wheel 52 is arranged in the vicinity of an end of the base member 51 in +x direction. As shown in FIG. 2, a pair of first wheels 52 is arranged at both sides in +z direction and −z direction of the base member 51, respectively.

The second wheel 54 is arranged at a side opposite to the cassette main body 46 across the base member 51 in y direction, as shown in FIG. 3. The second wheel 54 is supported by the base member 51 in a state in which the second wheel 54 is rotatable around a rotation axis parallel to y direction. The second wheel 54 is arranged at a position in −x direction with respect to the center of the base member 51 in x direction. As shown in FIG. 2, a pair of second wheels 54 is arranged at both sides in +z direction and −z direction of the base member 51, respectively.

The third wheel 56 is arranged at a side opposite to the cassette main body 46 across the base member 51 in y direction, as shown in FIG. 3. The third wheel 56 is supported by the base member 51 in a state in which the third wheel 56 is rotatable around a rotation axis parallel to y direction. The third wheel 56 is arranged in the vicinity of the end of the base member 51 in −x direction. As shown in FIG. 2, a pair of third wheels 56 is arranged at both sides in +z direction and −z direction of the base member 51, respectively.

The frame 60 has a rail member 62, a connecting member 66, a pivot support mechanism 67, a draw-out stopper 64, a draw-out buffer 64s, a draw-out pivot stopper 71, and an accommodation pivot stopper 72.

Figure 4:
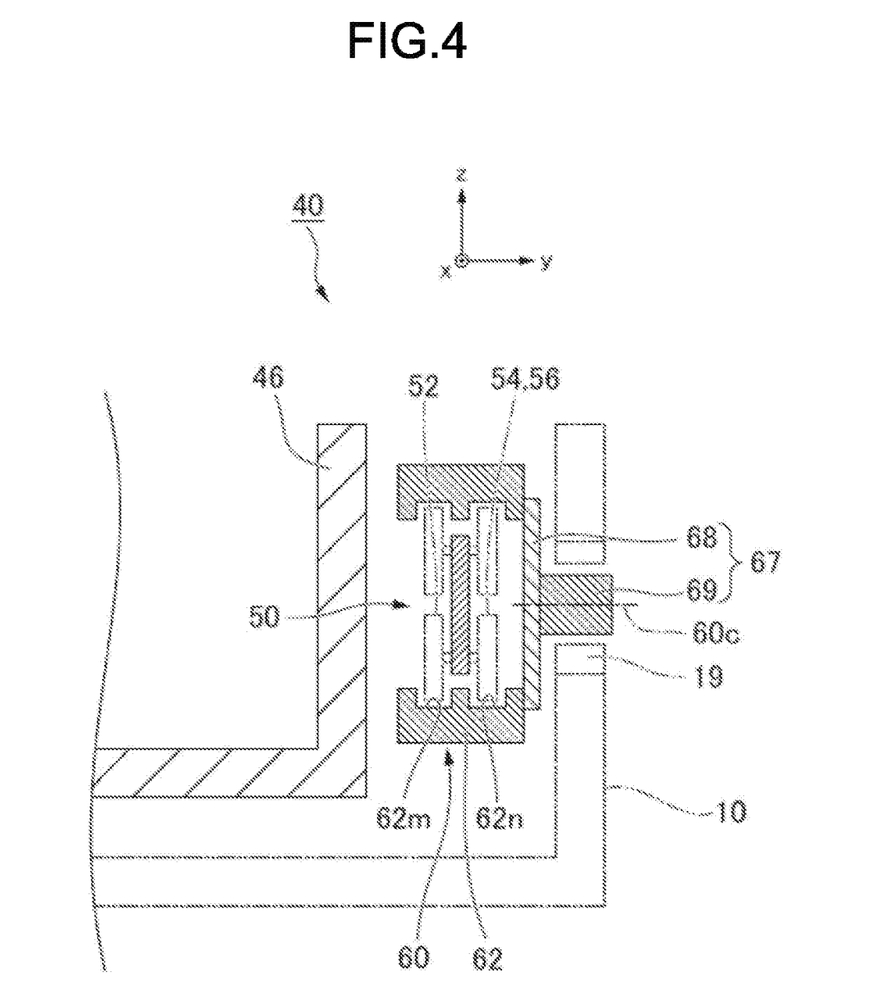
FIG. 4 is a cross-sectional view of the sheet housing device taken along an IV-IV line in FIG. 2.

FIG. 4 is a cross-sectional view of the sheet housing device 40 taken along an IV-IV line in FIG. 2.

The rail member 62 is formed in an elongated plate shape extending in x direction. A normal direction of the rail member 62 is parallel to z direction. The pair of rail members 62 is arranged in +z direction and −z direction of the moving mechanism 50 of the cassette main body 46.

The rail member 62 has an inner rail 62m and an outer rail 62n. The rails 62m and 62n are formed on opposed surfaces of the pair of rail members 62. Each of the rails 62m and 62n is formed by a groove or ridge extending in x direction. The inner rail 62m is formed on an inner side in y direction (a side close to the cassette main body 46) of the rail member 62. The inner rail 62m guides rotation of the first wheel 52. The outer rail 62n is formed on the outer side in y direction (a side away from the cassette main body 46) of the rail member 62. The outer rail 62n guides the rotation of the second wheel 54 and the third wheel 56.

The connecting member 66 is arranged in −x direction of the cassette main body 46, as shown in FIG. 2. A pair of rail members 62 is connected to both sides in z direction of the connecting member 66. As shown in FIG. 3, the connecting member 66 connects the pair of rail members 62 arranged on both sides in y direction of the cassette main body 46 to each other.

The pivot support mechanism 67 has a bridge 68 and a support shaft (support member) 69.

The bridge 68 is arranged on an outer side in y direction of the pair of rail members 62, as shown in FIG. 4. Both ends of the bridge 68 in z direction are respectively connected to the rail members 62.

The support shaft 69 extends towards outer side in y direction from the bridge 68. A support hole 19 is formed in the housing 10 of the image forming apparatus 1. The support shaft 69 is inserted into the support hole 19 in a rotatable manner. Thereby, the frame 60 is supported by the image forming apparatus 1 in a manner of being rotatable in r direction. A pivot axis 60c of the frame 60 is a center axis of the support shaft 69. The pivot axis 60c is parallel to y direction. The pivot axis 60c is arranged at the center in z direction of the frame 60. As shown in FIG. 2, the pivot axis 60c is arranged in +x direction with respect to a center of gravity G of the frame 60 and the cassette 42 (hereinafter, simply referred to as a center of gravity). The support shaft 69 is arranged along the pivot axis 60c.

In the present embodiment, the frame 60 has the support shaft 69 as a support member, and the image forming apparatus 1 has the support hole 19. Alternatively, the frame 60 may have the support hole as the support member, and the image forming apparatus 1 may have the support shaft. The support hole is arranged along the pivot axis 60c.

The draw-out stopper 64 is arranged at an end of the rail member 62 in +x direction. The draw-out stopper 64 protrudes towards the inner side of the pair of rail members 62 in z direction. As shown in FIG. 3, the draw-out stopper 64 is arranged only on the outer side of the rail member 62 in y direction. The draw-out stopper 64 prevents the second wheel 54 from being disengaged from the end of the rail member 62 in +x direction. The draw-out stopper 64 prevents the cassette 42 from being disengaged from the frame 60 in the drawn-out state. The draw-out stopper 64 specifies the limit of movement of the cassette 42 in +x direction.

The draw-out buffer 64s is attached to an end of the draw-out stopper 64 in −x direction, as shown in FIG. 2. For example, the draw-out buffer 64s is a spring. The draw-out buffer 64s is interposed between the draw-out stopper 64 and the second wheel 54. The draw-out buffer 64s relieves the impact when the second wheel 54 moves to the end in +x direction. The draw-out buffer 64s relieves the impact when the state of the cassette 42 changes to the drawn-out state.

The draw-out pivot stopper 71 is disposed on a surface in −z direction of the rail member 62 arranged in −z direction. The draw-out pivot stopper 71 is arranged at the end in +x direction of the rail member 62. If the state of the sheet housing device 40 changes from the accommodated state to the drawn-out state, the sheet housing device 40 pivots in +r direction. When the sheet housing device 40 pivots in +r direction, the draw-out pivot stopper 71 abuts against the housing 10 of the image forming apparatus 1. The draw-out pivot stopper 71 defines the limit of pivot of the sheet housing device 40 in +r direction.

The accommodation pivot stopper 72 is disposed on the surface of the rail member 62 in −z direction. The accommodation pivot stopper 72 is arranged at an end of the rail member 62 in −x direction. When the state of the sheet housing device 40 changes from the drawn-out state to the accommodated state, the sheet housing device 40 pivots in −r direction. When the sheet housing device 40 pivots in −r direction, the accommodation pivot stopper 72 abuts the housing 10 of the image forming apparatus 1. The accommodation pivot stopper 72 defines a limit of pivot in −r direction of the sheet housing device 40.

In the present embodiment, the draw-out pivot stopper 71 and the accommodation pivot stopper 72 are disposed in the frame 60 of the sheet housing device 40. The draw-out pivot stopper 71 and the accommodation pivot stopper 72 abut against the housing 10 of the image forming apparatus 1 when the sheet housing device 40 pivots in r direction. Alternatively, the draw-out pivot stopper 71 and the accommodation pivot stopper 72 may be disposed in the housing 10 of the image forming apparatus 1. The draw-out pivot stopper 71 and the accommodation pivot stopper 72 abut against the frame 60 of the sheet housing device 40 when the sheet housing device 40 pivots in r direction.

The horizontal holding mechanism 78 has a holding member 77, a tapered surface 76, and an accommodation buffer 77s.

The holding member 77 is arranged in the vicinity of the end of the cassette main body 46 in −x direction. As shown in FIG. 3, the holding member 77 is close to the center with respect to the end of the cassette main body 46 in y direction. As shown in FIG. 2, the pair of holding members 77 is arranged in the vicinity of the end of the cassette main body 46 in +z direction and in the vicinity of the end of the cassette main body 46 in −z direction, respectively.

The tapered surface 76 is formed at an end of the holding member 77 in +x direction. The tapered surface 76 is parallel to y direction.

The tapered surface 76 has a lower tapered surface 76a and an upper tapered surface 76b.

The lower tapered surface 76a is formed at an end of the holding member 77 in −z direction. A normal direction of the lower tapered surface 76a is a direction between +x direction and +z direction. The lower tapered surface 76a can abut against a lower corner 46a of the cassette main body 46 in −x and −z directions.

The upper tapered surface 76b is formed at an end of the holding member 77 in +z direction. A normal direction of the upper tapered surface 76b is a direction between +x direction and −z direction. The upper tapered surface 76b can abut against an upper corner 46b of the cassette main body 46 in −x and +z directions.

The pair of tapered surfaces 76a and 76b defines the limit of movement of the cassette main body 46 in −x direction. The pair of tapered surfaces 76a and 76b functions as an accommodation stopper.

A width of each of the pair of tapered surfaces 76a and 76b in z direction increases in +x direction. The pair of tapered surfaces 76a and 76b has a horizontal holding function of guiding the cassette 42 shifting to the accommodated state to a horizontal position (predetermined position) and then holding the cassette 42. The horizontal holding function of the pair of tapered surfaces 76a and 76b is described below.

The accommodation buffer 77s is disposed between the end of the holding member 77 in −x direction and the housing 10 of the image forming apparatus 1. For example, the accommodation buffer 77s is a spring. The accommodation buffer 77s relieves the impact when the cassette 42 moves to the movement limit in −x direction. The accommodation buffer 77s relieves the impact when the state of the cassette 42 changes to the accommodated state.

The operation of the sheet housing device 40 is described below.

Figure 5:
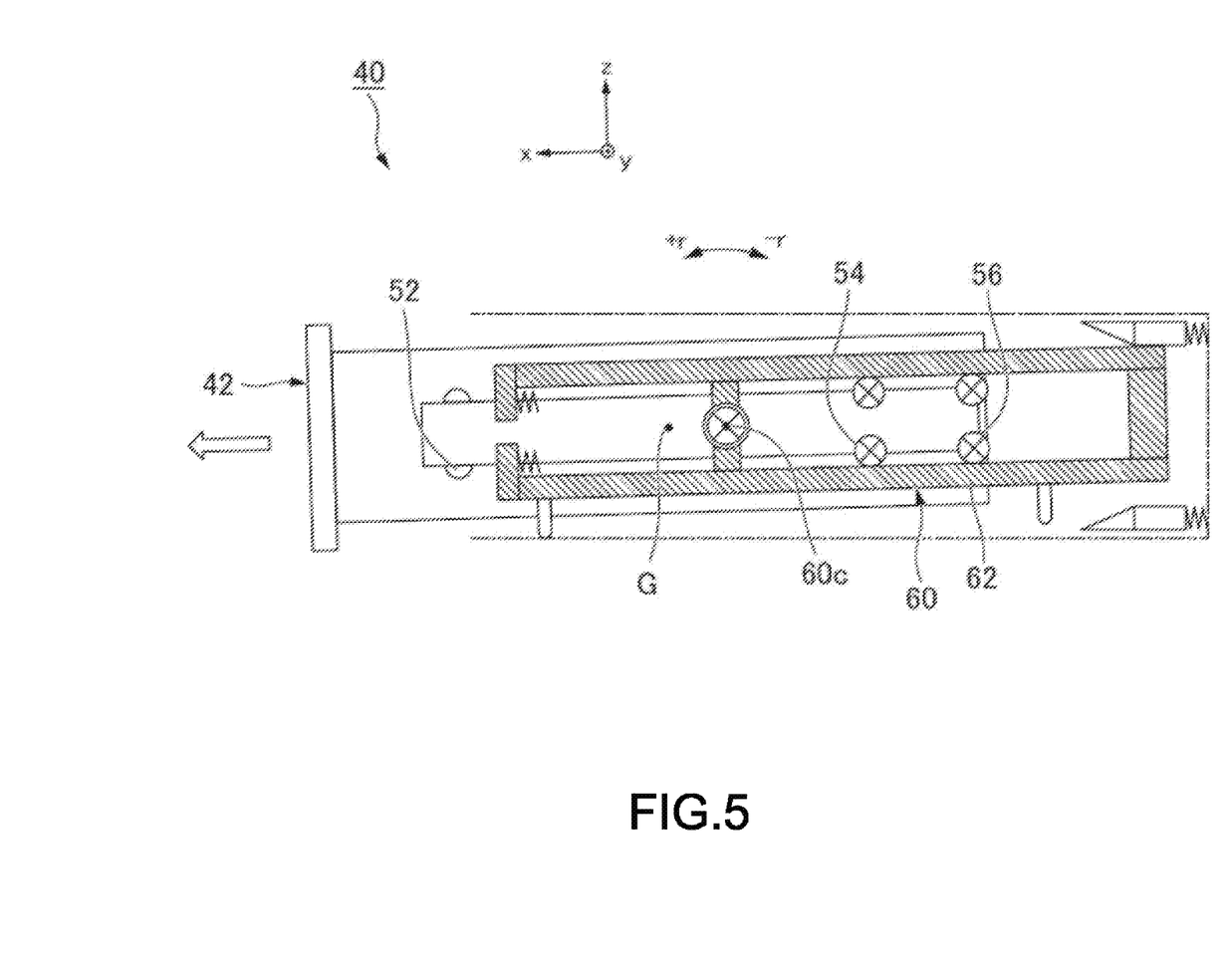
FIG. 5 is a diagram illustrating a first operation of the sheet housing device.
Figure 7:
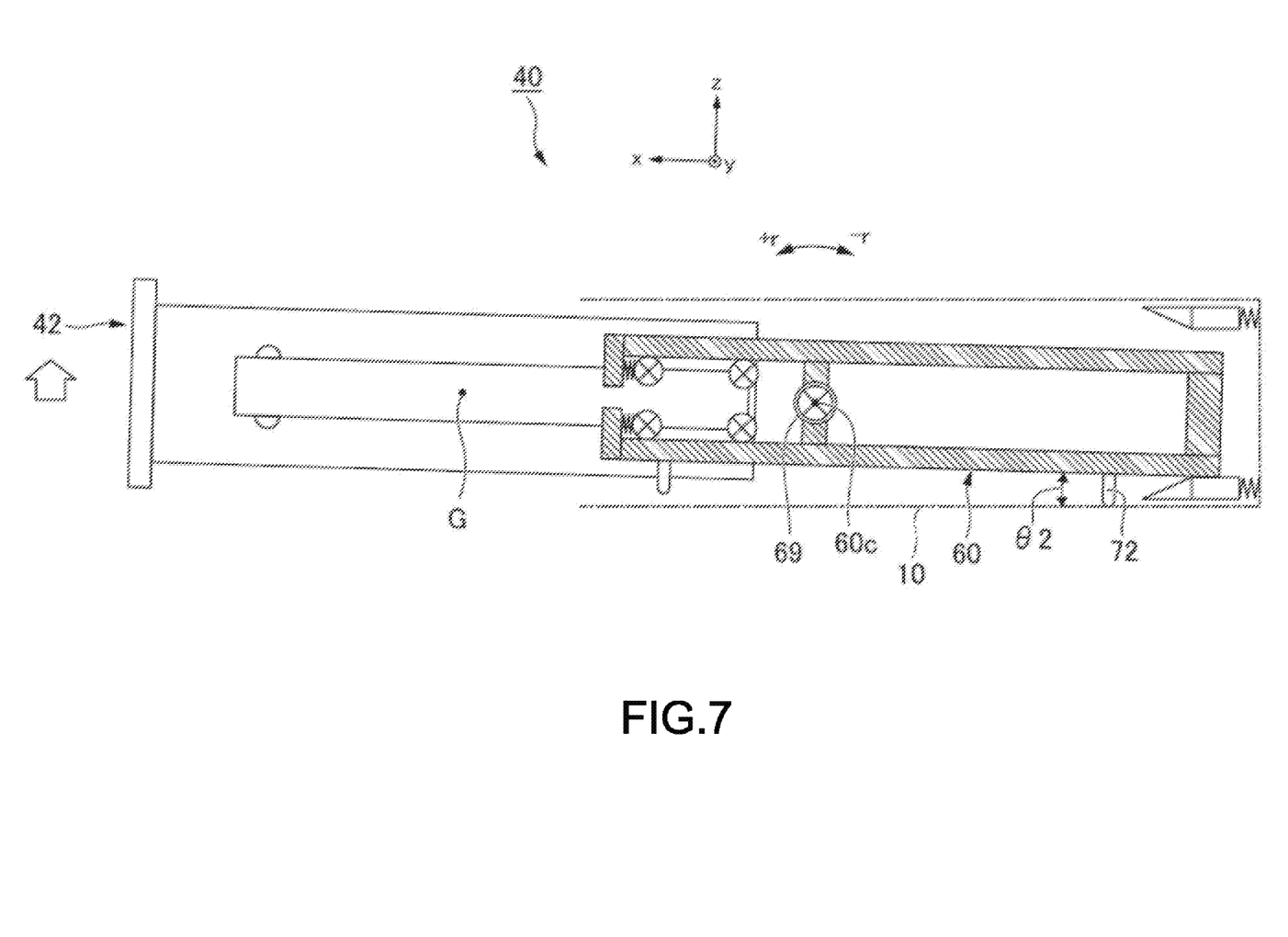
FIG. 7 is a diagram illustrating a third operation of the sheet housing device.
Figure 8:
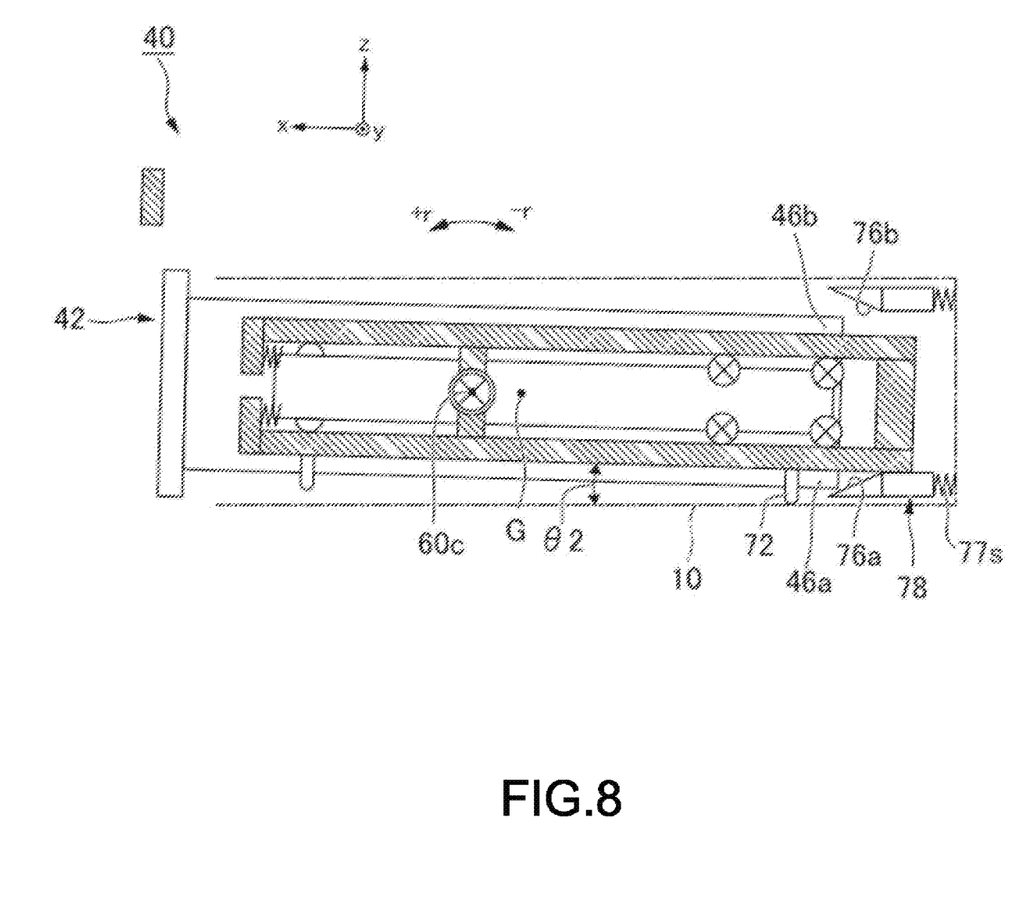
FIG. 8 is a diagram illustrating a fourth operation of the sheet housing device.

FIG. 5 is a diagram illustrating a first operation of the sheet housing device. FIG. 6 is a diagram illustrating a second operation of the sheet housing device. FIG. 7 is a diagram illustrating a third operation of the sheet housing device. FIG. 8 is a diagram illustrating a fourth operation of the sheet housing device.

A transition operation to the drawn-out state shown in FIG. 6 from the accommodated state shown in FIG. 2 is described below.

In the accommodated state shown in FIG. 2, the end of the cassette 42 in −x direction abuts against the pair of tapered surfaces 76a and 76b. The pair of tapered surfaces 76a and 76b regulates the pivot of the cassette 42 in r direction. Thereby, the cassette 42 is held horizontally in the accommodated state.

The moving mechanism 50 of the cassette 42 has the pair of first wheels 52, the pair of second wheels 54, and the pair of third wheels 56. The pair of wheels 52, the pair of wheels 54 and the pair of wheels 56 are arranged apart from each other in x direction. The wheels 52, 54 and 56 are arranged between the pair of rail members 62 of the frame 60. Therefore, pivot of the frame 60 in r direction with respect to the cassette 42 is restricted. Thereby, in the accommodated state of the cassette 42, the entire sheet housing device 40 including the cassette 42 and the frame 60 is held horizontally.

As shown in FIG. 5, the operator releases the movement restriction of the cassette 42 by a lock mechanism, and draws the cassette 42 out in +x direction. As shown in FIG. 4, the rail member 62 of the frame 60 has the inner rail 62m and the outer rail 62n. The first wheel 52 rolls along the inner rail 62m. The second wheel 54 and the third wheel 56 roll along the outer rail 62n. As shown in FIG. 3, the draw-out stopper 64 is arranged only at the end of the outer rail 62n in +x direction. The movement of the first wheel 52 in +x direction is not regulated by the draw-out stopper 64.

For this reason, the first wheel 52 may jump towards +x direction from the +x direction end of the frame 60, as shown in FIG. 5.

The pair of second wheels 54 and the pair of third wheels are arranged between the pair of rail members 62.

Therefore, even if the first wheel 52 jumps out of the frame 60, the pivot of the cassette 42 in the r direction with respect to the frame 60 is restricted.

If the cassette 42 is drawn out in +x direction, the end of the cassette 42 in −x direction is separated from the pair of tapered surfaces 76a and 76b. As a result, the cassette 42 is rotatable in r direction. When the center of gravity G moves in +x direction of the pivot axis 60c, the sheet housing device 40 pivots in +r direction due to its own weight. The cassette 42 is drawn out in +x direction due to its own weight. In other words, the draw-out operation of the cassette 42 by the operator is assisted by the weight of the cassette 42.

As shown in FIG. 6, if the frame 60 pivots in +r direction, the draw-out pivot stopper 71 of the frame 60 abuts against the housing 10 of the image forming apparatus 1. The draw-out pivot stopper 71 defines the limit of pivot of the sheet housing device 40 in +r direction. An angle of the frame 60 with respect to the housing 10 in a state in which the draw-out pivot stopper 71 abuts against the housing 10 is a draw-out maximum inclination angle θ1 of the frame 60. If the draw-out maximum inclination angle θ1 is large, the cassette 42 is easily drawn out by its own weight, and the draw-out operation is strongly assisted. In the image forming apparatus 1, since the sheet in the cassette 42 is consumed due to the operation of the image forming apparatus 1, the cassette 42 is drawn out in a light state in which there is no sheet. In the image forming apparatus 1, the draw-out operation of the cassette 42 hardly needs assistance. Therefore, in the image forming apparatus 1, the draw-out maximum inclination angle θ1 of the frame 60 is set small. Therefore, the height of the draw-out pivot stopper 71 is set relatively largely.

As shown in FIG. 6, the state of the sheet housing device 40 changes to the drawn-out state. The movement of the cassette 42 in +x direction is regulated by the draw-out stopper 64. In this way, the cassette 42 can be prevented from being disengaged from the frame 60.

The draw-out operation of the cassette 42 is assisted by the weight of the cassette 42. Therefore, the impact when the cassette 42 reaches the limit of movement in +x direction is increased. Between the second wheel 54 and the draw-out stopper 64, the draw-out buffer 64s is interposed. The draw-out buffer 64s relieves the impact when the state of the sheet housing device 40 changes to the drawn-out state.

The transition operation to the accommodated state shown in FIG. 2 from the drawn-out state shown in FIG. 6 is described.

As shown in FIG. 7, the operator lifts up the end of the cassette 42 in +x direction in +z direction. As a result, the sheet housing device 40 pivots in −r direction. The cassette 42 is inserted into the frame 60 by its own weight. In other words, the accommodation operation of the cassette 42 by the operator is assisted by the weight of the cassette 42. However, until the center of gravity G moves in −x direction from the pivot axis 60c, the operator restricts the pivot towards +r direction of the sheet housing device 40.

When the frame 60 pivots in −r direction, the accommodation pivot stopper 72 of the frame 60 abuts against the housing 10 of the image forming apparatus 1. The accommodation pivot stopper 72 defines the limit of pivot towards −r direction of the sheet housing device 40. An angle of the frame 60 with respect to the housing 10 in a state in which the accommodation pivot stopper 72 abuts against the housing 10 is an accommodation maximum inclination angle θ2 of the frame 60. If the accommodation maximum inclination angle θ2 is large, the cassette 42 is easily inserted by its own weight, and the accommodation operation of the cassette 42 is strongly assisted. In the image forming apparatus 1, since the cassette 42 is accommodated after replenishing the sheet, the cassette 42 is accommodated in a heavy state. In the image forming apparatus 1, the assistance with the accommodation operation of the cassette 42 is strongly needed. Therefore, in the image forming apparatus 1, the accommodation maximum inclination angle θ2 in −r direction of the frame 60 is set largely. For example, the draw-out maximum inclination angle θ1 and the accommodation maximum inclination angle θ2 are set in such a manner that θ1<θ2. Therefore, the height of the accommodation pivot stopper 72 is set relatively small.

In the image forming apparatus 1, the assistance for the accommodation operation of the cassette 42 is preferable. It is desirable that the support shaft 69 of the frame 60 is arranged in the vicinity of the end of the frame 60 in +x direction. As a result, in an initial stage of the accommodation operation of the cassette 42, the center of gravity G moves in −x direction of the pivot axis 60c. In other words, at the initial stage of the accommodation operation of the cassette 42, the sheet housing device 40 pivots in −r direction due to its own weight. Thereby, the accommodation operation of the cassette 42 can be assisted.

As shown in FIG. 8, if the cassette 42 is inserted, the center of gravity G moves in −x direction of the pivot axis 60c. The sheet housing device 40 pivots in +r direction due to its own weight. The operator can stop the rotation restriction towards +r direction of the sheet housing device 40. The cassette 42 continues to be drawn in −x direction by its own weight. In other words, the accommodation operation of the cassette 42 by the operator is assisted by the own weight of the cassette 42.

The horizontal holding function of the horizontal holding mechanism 78 is described.

When the state of the sheet housing device 40 changes to the accommodated state, the lower corner 46a of the cassette abuts against the lower tapered surface 76a of the horizontal holding mechanism 78. If the cassette 42 continues to move in −x direction, the lower corner 46a is guided by the lower tapered surface 76a, and the cassette 42 pivots in +r direction. If the upper corner 46b of the cassette 42 abuts against the upper tapered surface 76b, the pivot of the cassette 42 towards +r direction and −x direction is stopped. The cassette 42 abuts against both of the pair of tapered surfaces 76a and 76b in the accommodated state. In this way, the sheet housing device 40 is held in a horizontal position in the accommodated state. The movement of the cassette 42 towards −x direction is regulated by the pair of tapered surfaces 76a and 76b of the horizontal holding mechanism 78. In the accommodated state of the cassette 42, the movement restriction by the lock mechanism is added.

The accommodation operation of the cassette 42 is assisted by the weight of the cassette 42. Therefore, the impact when the cassette 42 reaches the limit of movement in −x direction is increased. An accommodation buffer 77s is interposed between the holding member 77 having the pair of tapered surfaces 76a and 76b and the housing 10 of the image forming apparatus 1. The accommodation buffer 77s relieves the impact when the state of the sheet housing device 40 changes to the accommodated state.

As described in detail above, the image forming apparatus 1 has the sheet housing device 40 and an image forming unit 3 that performs image formation processing on the sheet. The accommodation maximum inclination angle θ2 of the frame 60 in the sheet housing device 40 is larger than the draw-out maximum inclination angle θ1.

In the image forming apparatus 1, since the cassette 42 is accommodated after replenishing the sheet, the cassette 42 is accommodated in a heavy state. Since the sheet housing device 40 has a relationship of θ2>θ1, the accommodation operation of the cassette 42 is strongly assisted.

In the first embodiment, the accommodation maximum inclination angle θ2 and the draw-out maximum inclination angle θ1 are set to satisfy θ2>θ1. The accommodation maximum inclination angle θ2 and the draw-out maximum inclination angle θ1 may be set to satisfy θ2=θ1.

Second Embodiment

Figure 9:
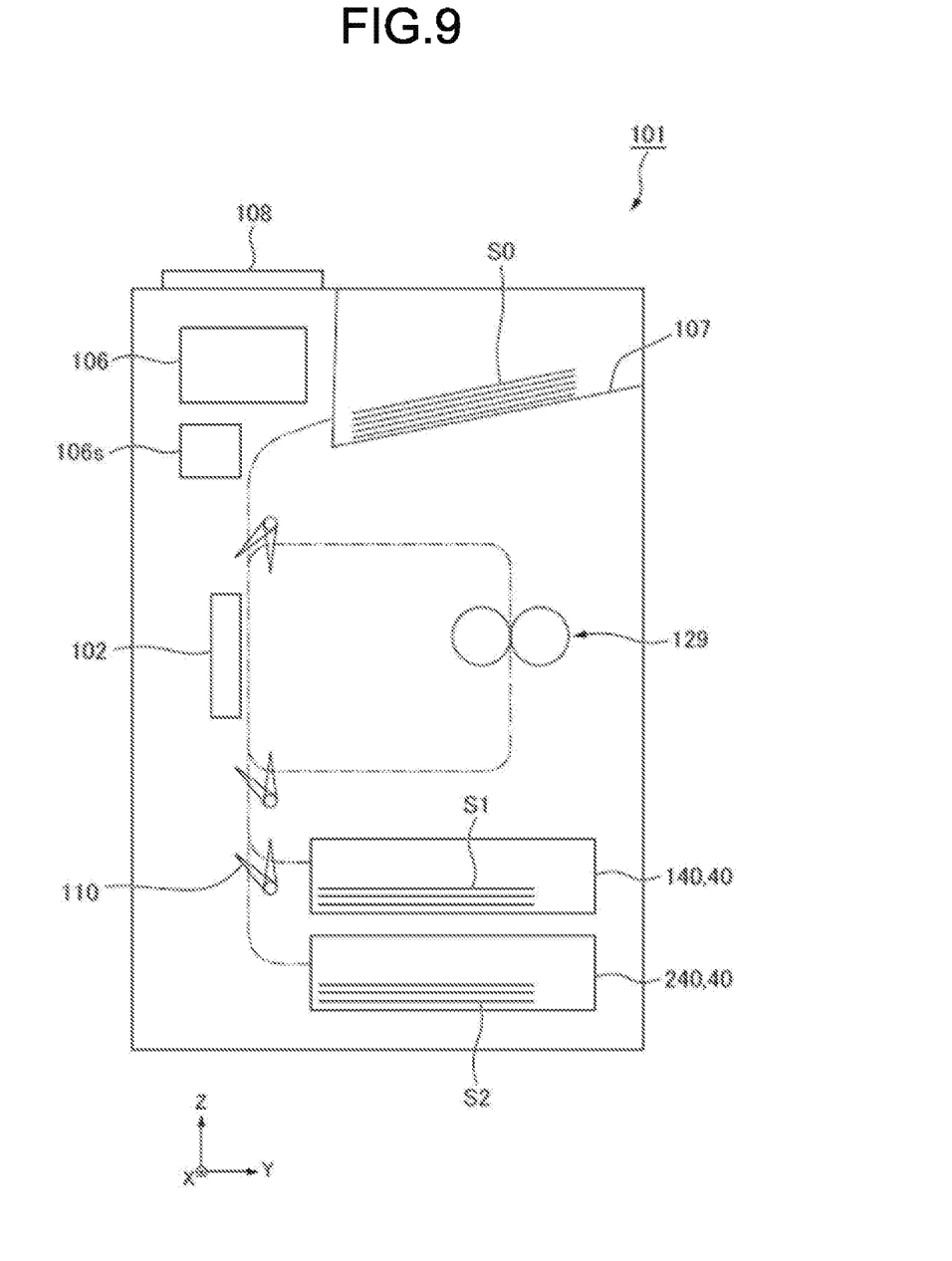
FIG. 9 is a diagram schematically illustrating a configuration of an image processing apparatus according to a second embodiment.

FIG. 9 is a diagram schematically illustrating a configuration of the image processing apparatus according to a second embodiment.

The image processing apparatus of the second embodiment is a decoloring apparatus 101. The decoloring apparatus 101 performs a processing of decoloring (erasing) an image formed on the sheet with the decolorable toner.

The decoloring apparatus 101 comprises a control panel 108, a sheet feed tray 107, a decoloring section 129, a reading section 102, a controller 106, a storage section 106s, a first sheet housing section 140, and a second sheet housing section 240.

The control panel 108 has an input section and a display section. The input section receives an operation input from an operator. The display section displays various kinds of information.

The sheet feed tray 107 places a sheet S0 to be subjected to a decoloring processing. The sheet S0 is the sheet on which the image is formed with the decolorable toner.

The decoloring section 129 performs an image decoloring processing to the sheet S0. The decoloring section 129 heats and decolors the decolorable toner of the sheet S0.

The reading section 102 reads an image formed on the sheet S0. The reading section 102 reads an image before a decoloring processing (hereinafter, referred to as an unprocessed image) and an image after the decoloring processing (hereinafter, referred to as a processed image). The read image is transmitted to the controller 106.

The controller 106 controls the operation of each section of the decoloring apparatus 101.

The controller 106 stores the unprocessed image received from the reading section 102 in the storage section 106s. The controller 106 reads data of an unprocessed image from the storage section 106s according to an operation input to the input section. The controller 106 displays the unprocessed image on the display section according to the operation input.

The controller 106 analyzes the processed image received from the reading section 102 to determine whether the image on the sheet is decolored.

If the image on the sheet S0 is formed with the decolorable toner, the image is decolored by the decoloring processing. The controller 106 designates the sheet determined that the image thereon is decolored as a reusable sheet S1. The controller 106 controls a gate 110 to discharge the reusable sheet S1 to the first sheet housing section 140.

If the image of the sheet S0 is not formed with the decolorable toner, the image is not decolored by the decoloring processing. The controller 106 discharges the sheet determined that the image thereon is not decolored as a non-reusable sheet S2. The controller 106 controls the gate 110 to discharge the non-reusable sheet S2 to the second sheet housing section 240.

The first sheet housing section 140 accommodates the reusable sheet S1.

The second sheet housing section 240 accommodates the non-reusable sheet S2.

The first sheet housing section 140 and the second sheet housing section 240 are the same as the sheet housing device 40 as in the first embodiment. For the sheet housing device 40 of the second embodiment, the description of the parts having the same configuration as in the first embodiment is omitted.

In the decoloring apparatus 101 shown in FIG. 9, since the sheet is discharged to the cassette 42 by operation of the decoloring apparatus 101, the cassette 42 may be drawn out with a heavy load. In the decoloring apparatus 101, the assistance with the draw-out operation of the cassette 42 may be desired. In the decoloring apparatus 101, the draw-out maximum inclination angle θ1 shown in FIG. 6 is set largely. Therefore, the height of the draw-out pivot stopper 71 is set relatively small.

The decoloring apparatus 101 shown in FIG. 9 accommodates the cassette 42 after the sheet is removed from the cassette 42. Therefore, the cassette 42 is accommodated with a light load, for example, with no sheet therein. In the decoloring apparatus 101, the assistance with the accommodation operation of the cassette 42 may not be necessary. In the decoloring apparatus 101, the accommodation maximum inclination angle θ2 shown in FIG. 8 is set small. For example, the draw-out maximum inclination angle θ1 and the accommodation maximum inclination angle θ2 are set to satisfy θ1>θ2. Therefore, the height of the accommodation pivot stopper 72 is set relatively small.

In the decoloring apparatus 101, the assistance with the draw-out operation of the cassette 42 is more likely to be needed. It is desirable that the support shaft 69 of the frame 60 is disposed near the center of gravity G. As a result, in the initial stage of the draw-out operation of the cassette 42, the center of gravity G moves in +x direction of the pivot axis 60c. In other words, at the initial stage of the draw-out operation of the cassette 42, the sheet housing device 40 pivots in +r direction due to its own weight. As a result, the draw-out operation of the cassette 42 can be assisted.

As described in detail above, the decoloring apparatus 101 has the sheet housing device 40 and a decoloring section 129 for performing an image decoloring processing on the sheet. The draw-out maximum inclination angle θ1 of the frame 60 in the sheet housing device 40 is larger than the accommodation maximum inclination angle θ2.

In the decoloring apparatus 101, since the sheet is discharged to the cassette 42, the cassette 42 may be drawn out with a heavy load. Since the sheet housing device 40 has a relationship of θ1>θ2, the draw-out operation of the cassette 42 can be strongly assisted.

In the second embodiment, the draw-out maximum inclination angle θ1 and the accommodation maximum inclination angle θ2 are set so as to satisfy θ1>θ2. The draw-out maximum inclination angle θ1 and the accommodation maximum inclination angle θ2 may be set so as to satisfy θ1=θ2.

The sheet housing device 40 of the embodiment has the cassette 42, the frame 60, and the support shaft 69. The cassette 42 accommodates the sheet S. The frame 60 supports the cassette 42 in such a manner that the cassette 60 is movable with respect to the frame 60 along +x direction and −x direction. +x direction is a direction in which the state of the cassette 42 changes from the accommodated state to the drawn-out state. −x direction is opposite to +x direction. The support shaft 69 is arranged along the pivot axis 60c perpendicular to +x direction and z direction. The support shaft 69 supports the frame 60 in such a manner that the frame 60 is rotatable around the pivot axis 60c.

According to such a configuration, since the frame 60 pivots in r direction, the cassette 42 moves in x direction due to its own weight. As a result, the draw-out operation and the insertion operation of the cassette 42 are assisted, and thus the draw-out operation and the insertion operation become easy. A special device such as a mechanism for automatically inserting the cassette is unnecessary and the cost of the sheet housing device 40 is suppressed. No special device installation space is required, and the sheet housing device 40 can be compact. The change in the load due to the insertion operation by the special mechanism can be eliminated, and the operability of the sheet housing device 40 can be improved.

The support shaft 69 is arranged in +x direction with respect to the position of the center of gravity G of the cassette 42 and the frame 60 in the accommodated state.

The position of the center of gravity G crosses the support shaft 69 as the cassette 42 is inserted and drawn out. At this time, the frame 60 pivots in a direction to assist the draw-out operation and the insertion operation of the cassette 42. Therefore, the cassette 42 can be inserted and drawn out easily.

The sheet housing device 40 has a horizontal holding mechanism 78 for guiding the cassette 42 whose state changes to the accommodated state to a predetermined position and holding the cassette 42.

According to such a configuration, the cassette 42 is held at the predetermined position in the accommodated state. Therefore, the sheet accommodated in the cassette 42 can be held in a stable state.

The horizontal holding mechanism 78 has the holding member 77 arranged at the end of the cassette 42 in −x direction in the accommodated state. The holding member 77 has the pair of tapered surfaces 76a and 76b of which width in z direction increases in +x direction. The cassette 42 abuts against both of the pair of tapered surfaces 76a and 76b in the accommodated state.

According to such a configuration, the cassette 42 of which state changes to the accommodated state is guided to a predetermined position by the pair of tapered surfaces 76a and 76b. The cassette 42 is held while abutting against both of the pair of tapered surfaces 76a and 76b. The horizontal holding mechanism 78 is formed at low cost.

The sheet housing device 40 has the accommodation buffer 77s to relieve the impact when the state of the cassette 42 changes to the accommodated state.

According to such a configuration, even when the state of the cassette 42 changes to the accommodated state by its own weight, the impact at the time of transition can be relieved.

The sheet housing device 40 has the draw-out stop 64 which prevents the cassette 42 from being disengaged from the frame 60 in the drawn-out state.

According to such a configuration, even when the state of the cassette 42 changes to the drawn-out state due to its own weight, the frame 60 is prevented from being disengaged.

The sheet housing device 40 has the draw-out buffer 64s to relieve the impact when the state of the cassette 42 changes to the drawn-out state.

According to this configuration, even when the state of the cassette 42 changes to the drawn-out state due to its own weight, the impact at the time of transition can be relieved.

The sheet housing device 40 has the draw-out pivot stopper 71 and the accommodation pivot stopper 72. The draw-out pivot stopper 71 defines the limit of pivot of the frame 60 when the frame 60 of the support shaft 69 in +x direction pivots in −z direction. The accommodation pivot stopper 72 defines the limit of pivot of the frame 60 when the frame 60 of the support shaft 69 in −x direction pivots in −z direction.

According to such a configuration, by adjusting the height of the draw-out pivot stopper 71, the draw-out maximum inclination angle θ1 of the frame 60 is set to a desired angle. By adjusting the height of the accommodation pivot stopper 72, the accommodation maximum inclination angle θ2 of the frame 60 is set to a desired angle.

According to at least one embodiment described above, the support shaft 69 that supports the frame 60 in such a manner that the frame 60 is rotatable around the pivot axis 60c is provided. As a result, since the frame 60 pivots, the cassette 42 moves by its own weight. Thus, the draw-out operation and the insertion operation of the cassette 42 are assisted, and thus the draw-out operation and the insertion operation become easy.

While certain embodiments have been described these embodiments have been presented by way of example only, and are not intended to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sheet housing device, comprising:
    a sheet cassette;
    a frame configured to support the sheet cassette such that the sheet cassette is movable relative to the frame between a closed position and a drawn-out position along a first direction different from a gravity direction;
    a support member configured to support the frame such that the frame is rotatable around a pivot axis extending in a second direction orthogonal to the first direction and the gravity direction; and
    a holding mechanism configured to guide the sheet cassette moving toward the closed position to the closed position and hold the sheet cassette at the closed position, the holding mechanism including a first tapered surface positioned to contact a first corner of the sheet cassette and a second tapered surface positioned to contact a second corner of the sheet cassette opposite to the first corner in the gravity direction, when the sheet cassette is at the closed position, wherein
    the pivot axis is disposed at a position between a gravity center of the sheet cassette at the closed position and a gravity center of the sheet cassette at the drawn-out position, and
    the sheet cassette rotates around the pivot axis, according to a weight of the sheet cassette, in a first rotational direction when the sheet cassette is moved towards the drawn-out position and in a second rotational direction opposite to the first rotational direction when the sheet cassette is moved towards the closed position.

2. The sheet housing device according to claim 1, further comprising a first stopper disposed to limit, to a first maximum angle, a rotation of the frame according to the weight of the sheet cassette in the first rotational direction when the sheet cassette is moved toward the drawn-out position.

3. The sheet housing device according to claim 2, further comprising a second stopper disposed to limit, to a second maximum angle, a rotation of the frame according to the weight of the sheet cassette in the second rotational direction when the sheet cassette is moved toward the closed position.

4. The sheet housing device according to claim 3, wherein the first maximum angle is equal to or greater than the second maximum angle.

5. The sheet housing device according to claim 3, wherein the second maximum angle is equal to or greater than the first maximum angle.

6. The sheet housing device according to claim 1, further comprising a buffer configured to reduce an impact when the sheet cassette is moved to the closed position.

7. The sheet housing device according to claim 1, further comprising a stopper configured to limit movement of the sheet cassette to a position no farther than the drawn-out position.

8. The sheet housing device according to claim 7, further comprising a buffer configured to reduce an impact when the sheet cassette is moved to the drawn-out position.

9. The sheet housing device according to claim 1, the pivot axis is not movable along with movement of the sheet cassette.

10. An image forming apparatus, comprising:
    an image forming device; and
    a sheet housing device configured to store a sheet to be conveyed to the image forming device for image forming, the sheet housing device comprising:
    a sheet cassette;
    a frame configured to support the sheet cassette such that the sheet cassette is movable relative to the frame between a closed position and a drawn-out position along a first direction different from a gravity direction;
    a support member configured to support the frame such that the frame is rotatable around a pivot axis extending in a second direction orthogonal to the first direction and the gravity direction; and
    a holding mechanism configured to guide the sheet cassette moving toward the closed position to the closed position and hold the sheet cassette at the closed position, the holding mechanism including a first tapered surface positioned to contact a first corner of the sheet cassette and a second tapered surface positioned to contact a second corner of the sheet cassette opposite to the first corner in the gravity direction, when the sheet cassette is at the closed position, wherein
    the pivot axis is disposed at a position between a gravity center of the sheet cassette at the closed position and a gravity center of the sheet cassette at the drawn-out position, and
    the sheet cassette rotates around the pivot axis, according to a weight of the sheet cassette, in a first rotational direction when the sheet cassette is moved towards the drawn-out position and in a second rotational direction opposite to the first rotational direction when the sheet cassette is moved towards the closed position.

11. The image forming apparatus according to claim 10, wherein the sheet housing device further comprises:
    a first stopper disposed to limit, to a first maximum angle, a rotation of the frame according to the weight of the sheet cassette in the first rotational direction when the sheet cassette is moved toward the drawn-out position; and a second stopper disposed to limit, to a second maximum angle, a rotation of the frame according to the weight of the sheet cassette in the second rotational direction when the sheet cassette is moved toward the closed position.

12. The image forming apparatus according to claim 11, wherein the first maximum angle is equal to or greater than the second maximum angle.

13. An image decoloring apparatus, comprising:
an image decoloring device; and
a sheet housing device configured to receive a sheet from the image decoloring device after image decoloring processing, the sheet housing device comprising:
  a sheet cassette;
  a frame configured to support the sheet cassette such that the sheet cassette is movable relative to the frame between a closed position and a drawn-out position along a first direction different from a gravity direction;
  a support member configured to support the frame such that the frame is rotatable around a pivot axis extending in a second direction orthogonal to the first direction and the gravity direction; and
  a holding mechanism configured to guide the sheet cassette moving toward the closed position to the closed position and hold the sheet cassette at the closed position, the holding mechanism including a first tapered surface positioned to contact a first corner of the sheet cassette and a second tapered surface positioned to contact a second corner of the sheet cassette opposite to the first corner in the gravity direction, when the sheet cassette is at the closed position, wherein the pivot axis is disposed at a position between a gravity center of the sheet cassette at the closed position and a gravity center of the sheet cassette at the drawn-out position, and the sheet cassette rotates around the pivot axis, according to a weight of the sheet cassette, in a first rotational direction when the sheet cassette is moved towards the drawn-out position and in a second rotational direction opposite to the first rotational direction when the sheet cassette is moved towards the closed position.

14. The image decoloring apparatus according to claim 13, wherein the sheet housing device further comprises:
  a first stopper disposed to limit, to a first maximum angle, a rotation of the frame according to the weight of the sheet cassette in the first rotational direction when the sheet cassette is moved toward the drawn-out position; and
  a second stopper disposed to limit, to a second maximum angle, a rotation of the frame according to the weight of the sheet cassette in the second rotational direction when the sheet cassette is moved toward the closed position.

15. The image decoloring apparatus according to claim 14, wherein the second maximum angle is equal to or greater than the first maximum angle.

* * * * *